(12) United States Patent
Filsinger et al.

(10) Patent No.: US 9,868,237 B2
(45) Date of Patent: Jan. 16, 2018

(54) MOLD FOR PRODUCING FIBER-REINFORCED COMPONENTS

(75) Inventors: Juergen Filsinger, Hoehenkirchen-Siegertsbrunn (DE); Frank Strachauer, Starnberg (DE)

(73) Assignee: EADS Deutschland GmbH, Ottobrunn (DE)

( * ) Notice: Subject to any disclaimer, the term of this patent is extended or adjusted under 35 U.S.C. 154(b) by 484 days.

(21) Appl. No.: 13/805,530

(22) PCT Filed: Jun. 20, 2011

(86) PCT No.: PCT/DE2011/001324
§ 371 (c)(1),
(2), (4) Date: Dec. 19, 2012

(87) PCT Pub. No.: WO2012/010129
PCT Pub. Date: Jan. 26, 2012

(65) Prior Publication Data
US 2013/0099429 A1   Apr. 25, 2013

(30) Foreign Application Priority Data

Jun. 25, 2010   (DE) .................. 10 2010 025 068

(51) Int. Cl.
| | | |
|---|---|---|
| *B29C 70/44* | (2006.01) | |
| *B29C 45/17* | (2006.01) | |
| *B29C 43/36* | (2006.01) | |

(52) U.S. Cl.
CPC ........ *B29C 45/1701* (2013.01); *B29C 70/443* (2013.01); *B29C 43/3642* (2013.01)

(58) Field of Classification Search
CPC ............. B29C 45/1701; B29C 70/443; B29C 43/3642; B29C 70/547; B29C 70/548
See application file for complete search history.

(56) References Cited

U.S. PATENT DOCUMENTS 2,913,036 A * 11/1959 Smith ......................... 264/102
3,146,148 A *  8/1964 Mitchella ............... B21D 47/00
156/382

(Continued)

FOREIGN PATENT DOCUMENTS

DE     100 13 409 C1   11/2000
DE     102 03 975 C1    1/2003

(Continued)

OTHER PUBLICATIONS

English translation of the Abstract for EP 1484164 to Bauer, published Dec. 8, 2004, 2 pages.*

(Continued)

*Primary Examiner* — Matthew Daniels
(74) *Attorney, Agent, or Firm* — Crowell & Moring LLP

(57) ABSTRACT

A mold for a production device for production of fiber-reinforced components by means of an injection process is provided. The mold has a mold surface to form a surface of the fiber-reinforced component, the mold surface having a first partial area and a second partial area and in which the mold has an injection area for injection of matrix material into fibrous material situated on the mold surface through the second partial area of the mold surface and evacuation area for evacuation of a mold volume bounded by the mold through the first partial area of the mold surface.

14 Claims, 2 Drawing Sheets

(56) References Cited

U.S. PATENT DOCUMENTS

| | | | |
|---|---|---|---|
| 4,681,651 A * | 7/1987 | Brozovic | B29C 43/3607 |
| | | | 156/104 |
| 5,015,168 A * | 5/1991 | Boime et al. | 425/389 |
| 5,152,949 A * | 10/1992 | Leoni et al. | 264/257 |
| 5,316,462 A * | 5/1994 | Seemann | 425/112 |
| 5,939,013 A * | 8/1999 | Han et al. | 264/510 |
| 6,257,858 B1 * | 7/2001 | Pabsch et al. | 425/129.1 |
| 6,555,045 B2 * | 4/2003 | McClure et al. | 264/510 |
| 6,843,953 B2 | 1/2005 | Filsinger et al. | |
| 7,138,028 B2 * | 11/2006 | Burpo et al. | 156/245 |
| 7,393,494 B2 * | 7/2008 | Mataya et al. | 264/510 |
| 7,727,449 B2 | 6/2010 | Lorenz et al. | |
| 7,931,458 B2 | 4/2011 | Lippert et al. | |
| 8,197,244 B2 | 6/2012 | Utecht et al. | |
| 2002/0022422 A1 * | 2/2002 | Waldrop et al. | 442/179 |
| 2004/0219244 A1 | 11/2004 | Filsinger et al. | |
| 2005/0034603 A1 * | 2/2005 | Lippert et al. | 96/193 |
| 2007/0296126 A1 | 12/2007 | Audette | |
| 2009/0051076 A1 * | 2/2009 | Kofoed et al. | 264/258 |
| 2010/0283180 A1 * | 11/2010 | De Vita et al. | 264/258 |
| 2011/0139344 A1 * | 6/2011 | Watson et al. | 156/94 |

FOREIGN PATENT DOCUMENTS

| | | |
|---|---|---|
| DE | 101 40 166 A1 | 3/2003 |
| DE | 101 56 123 B4 | 7/2006 |
| DE | 10 2006 045 635 A1 | 4/2008 |
| DE | 10 2008 006 261 B3 | 1/2009 |
| DE | 10 2008 028 865 A1 | 12/2009 |
| EP | 1484164 * | 12/2004 |
| WO | WO 2006058540 * | 6/2006 |

OTHER PUBLICATIONS

Corresponding International Search Report with English Translation dated Jan. 23, 2012 (five (5) pages).
German-language Written Opinion dated Jan. 23, 2012 (PCT/ISA/237) (six (6) pages).

* cited by examiner

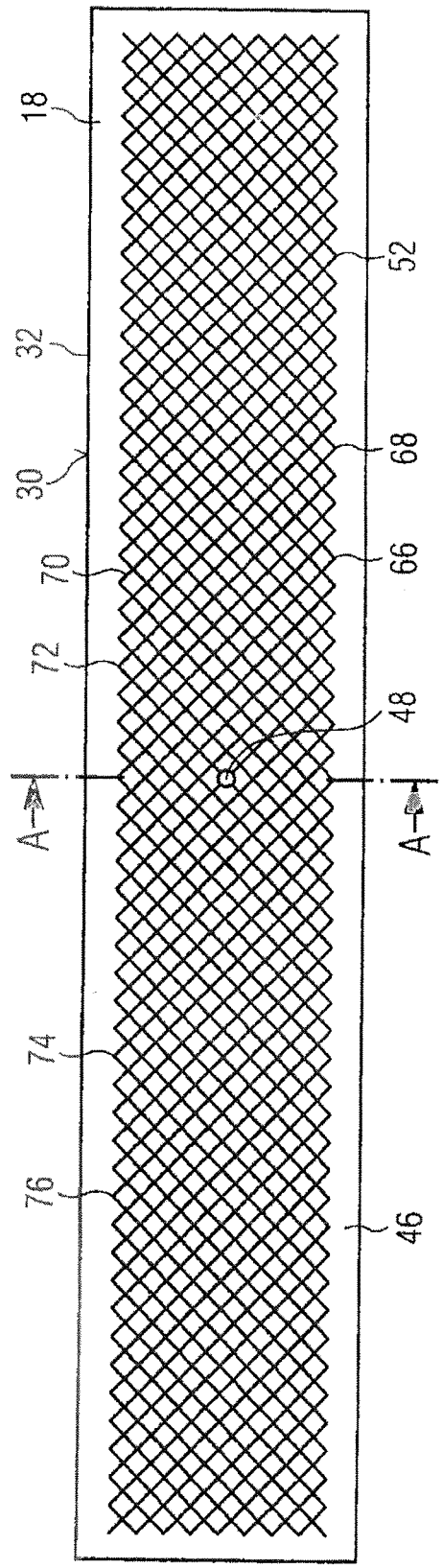
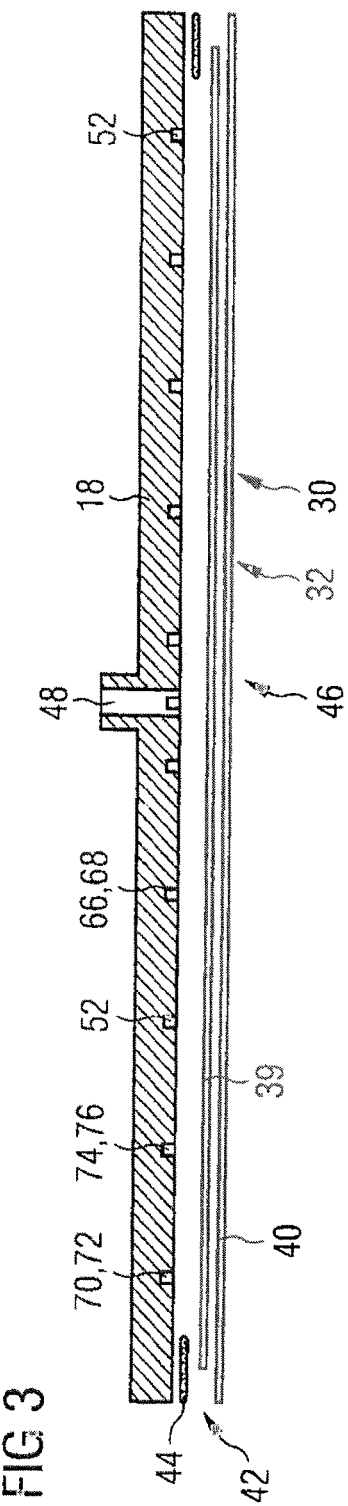
FIG. 2
FIG. 3

MOLD FOR PRODUCING FIBER-REINFORCED COMPONENTS

BACKGROUND AND SUMMARY OF THE INVENTION

Exemplary embodiments of the present invention are directed to a mold and a production device for production of fiber-reinforced components by means of an injection process and a method for production of fiber-reinforced components by means of an injection process.

Dry fibrous semi-finished products are generally infiltrated with a matrix material and cured in the injection process. Such methods are also referred to as liquid resin infusion (LRI) methods. The fibrous semi-finished products can be formed from carbon fibers (CF-reinforced plastics), glass fibers (GF-reinforced plastics), aramid fibers (AF-reinforced plastics), boron fibers (BF-reinforced plastics) or hybrid materials and from corresponding fabrics or lays.

A known method for producing fiber-reinforced components by means of an injection process is described in German Patent Document DE 100 13 409 C1. In this case a fibrous semi-finished product is placed on a mold. A flow aid is arrange on the surface of the fibrous semi-finished product and a first space is formed by providing a gas-permeable and matrix material-impermeable membrane around the fibrous material and the flow aid. The second space is formed around the first space by arranging a gas- and matrix material-impermeable film and it is sealed against the mold. The flow aid is connected to a supply vessel for the matrix material. A vacuum line extends into the second space. A partial vacuum is now applied via the vacuum line, the matrix material is drawn in from the supply vessel into the flow aid by the resulting pressure difference, i.e., injected into the first space, and distributed over the fibrous semi-finished product. The matrix material impregnates the fibrous semi-finished product and cures. The air-permeable but matrix material-impermeable material membrane prevents matrix material from penetrating into the second space and therefore into the vacuum line but at the same time permits suction of the air found in the matrix material and fibrous semi-finished products. The matrix material can then cure without air inclusions and high-grade fiber-reinforced components can be produced.

An improvement of this process control can be achieved by the arrangement described in German Patent Document DE 101 401 66 B4, which includes pressure control means that generate a partial vacuum in the supply vessel toward the end of the injection phase or after it and in so doing create better controllability of the process and the component quality.

A device for improved degassing of a fibrous semi-finished product and the matrix material is described in German Patent Document DE 102 03 975 C1. Here a barrier layer impermeable for the matrix material is arranged in the first space above the first flow aid and an additional flow aid provided on it. In the area in which the barrier layer is situated between the first and second flow aid, a gate device is applied to the second flow aid, via which the matrix material is injected into the first space. When a partial vacuum is applied, the matrix material now initially flows into the second flow aid, in which case air present in the matrix material and fibrous semi-finished product can escape because of the applied partial vacuum. The barrier layer then prevents the matrix material from coming into contact with the first flow aid in the area of the gate device. The matrix material therefore initially passes through the second flow aid in the horizontal direction. The barrier layer is arranged so that the first and second flow aids come in contact at a location away from the gate device. The matrix material at this location comes in contact with the first flow aid and is distributed over it. From there it is further conveyed in the thickness direction to the fibrous semi-finished product and impregnates it. The extended path of the matrix material by means of the barrier layer through the evacuated volume of the first space means that the air present in the matrix material and in the fibrous semi-finished product initially escapes before it impregnates the fibrous semi-finished product. Air inclusions can thus be further reduced and the quality of the components further increased.

German Patent Document DE 101 56 123 B4 describes a structure by means of which a prepreg semi-finished product, which is already impregnated with resin, is joined to a textile semi-finished product to be impregnated with matrix material.

A common feature of all these devices and methods is that, before the beginning of the process, a demanding structure consisting of the puller, flow aid and the gas-permeable and matrix material-impermeable membrane must initially be produced to form a first space.

An improvement is therefore proposed in German Patent Document DE 10 2008 006 261 B3 in which a gas-permeable but matrix material-impermeable membrane is described, on which a flow aid is laminated and puller arranged. By provision of such a multifunction laminate only one layer to form the first space need be arranged above the fibrous semi-finished product. This significantly simplifies the process layout.

In order to be able to also produce components with different curvatures and/or torsions, German Patent Document DE 10 2008 028 865 A1 describes the provision of a bendable or twistable fibrous semi-finished product.

It is also common to the aforementioned devices and methods that a gas- and matrix material-impermeable film and a spacer are arranged above the gas-permeable and matrix material-impermeable membrane to form the second space. In addition, further molds are sometimes provided above the gas- and matrix material-impermeable membrane to form a shaped inside surface of the fiber-reinforced component. In particular, the preparation of this structure entails significant manual expense in large components with a complex internal contour.

Exemplary embodiments of the present invention are directed to production of fiber-reinforced components by means of an injection process with a less complicated and demanding structure.

Exemplary embodiments of the present invention are directed to a mold for production of fiber-reinforced components by means of an injection process has a mold surface to form a surface of the fiber-reinforced component with a partial area and a second partial area. The mold has an injection area for injection of matrix material and a fibrous material situated on the mold surface through the second partial area of the mold surface and an evacuation area for evacuation of a mold volume through the first partial area of the mold surface, in which the mold volume is limited by the mold.

Both the matrix material feed and the vacuum line are therefore advantageously introduced to the mold and a complicated and demanding structure becomes unnecessary in the devices just described. The method can therefore be significantly simplified.

In a preferred embodiment a puller for easier removal of the mold from a fiber-reinforced component is arranged on the mold surface. This puller, after curing of the matrix material introduced into the fibrous material, permits the mold to be advantageously removed easily from the surface of the fiber-reinforced component so formed.

The first partial area of the mold surface also preferably has a semi-permeable membrane for passage of gases and for retention of matrix material. The semi-permeable membrane makes it possible for gases to be removed from the mold volume by applying a vacuum to the evacuation area, in which case the matrix material is simultaneously retained in the mold volume. Accordingly, matrix material cannot penetrate into the evacuation area and clog it and thus make it ineffective.

The semi-permeable membrane and the puller are preferably formed as a composite in the first partial area of the mold surface. By using a composite only one step is necessary to position the membrane and puller, whereas otherwise two individual blanks must be applied to the mold. This composite is advantageously fixed with a peripheral adhesive to the mold surface. The peripheral adhesive is provided, on the one hand, to fasten the composite and, on the other hand, prevents liquid material from flowing over the edge into the evacuation area. The peripheral adhesive can preferably also be used to fasten and seal individual blanks of the semi-permeable membrane and/or the puller.

Flow aids for better distribution of the injected matrix materials are advantageously provided in the second partial area of the mold surface. The matrix material can therefore preferably be distributed quickly and uniformly over the fibrous material. A combination of one or more point or linear gates with a flat distribution medium can be applied, for example, an open-structured textile on the mold surface. Because of this the matrix material is preferably distributed with comparatively limited flow resistance over the fibrous material surface and essentially impregnates the fibrous material in the thickness direction. Channels and/or a groove pattern can advantageously be provided to distribute the matrix material in the second partial area of the mold surface so that additional aids in the form of gate channels or flat flow aids can be saved. The integrated matrix distribution is preferably configured so that it is impressed as little as possible into the surface of the fiber-reinforced component.

In a preferred embodiment flow aids are arranged in the first partial area for better evacuation of the mold volume. In order to advantageously provide adequate air supply in the first partial area of the mold surface it is advantageous if appropriately dimensioned flow aids are provided in the first partial area of the mold surface. These can be formed preferably as grooves. As an alternative, however, a textile, for example, a woven fabric, knit fabric, nonwoven or mesh can be provided in the first partial area of the mold surface.

The flow aids and/or the stream aids are therefore formed on a mold surface advantageously as grooves, channels, woven fabric, nonwoven, knit fabric or mesh.

In a particularly preferred variant the first partial area of the mold surface and the second partial area of the mold surface are formed in partial molds separate from each other but connectable to each other. It is thus advantageously possible, depending on the desired fiber-reinforced component, to provide an individual number of evacuation areas and injection areas on the mold.

A connection device for a tight connection of the partial molds is preferably provided. By means of a connection device the partial molds separated from each other can preferably be joined together vacuum-tight. The connection device can then preferably be formed from a flexible adhesive or sealing strip, a liquid or gel-like sealant, from profile seals glued onto the partial molds or introduced to them or from flexible sealing lips applied to the partial molds or integrated in them.

Due to the fact that preferably partial molds are provided with different areas, namely the injection or evacuation area, the mold can be constructed to form the fiber-reinforced component in preferably modular fashion. Because of this both different components and different component sizes can be achieved using the same partial molds.

A production device for production of fiber-reinforced components by means of an injection process advantageously has a mold with a mold surface to form a surface of the fiber-reinforced component and a vacuum device to evacuate a mold volume at least partially limited by the mold surface, within which the injection process is performed. The production process also has an injection device for injection of matrix material into the mold volume in order for a fibrous material arranged within the mold volume to penetrate into the area of the mold surface.

The injection device preferably has a matrix distribution device to distribute a matrix material. The matrix distribution device includes, on the one hand, lines that supply the matrix material over different sites of the fibrous material and, on the other hand, a supply vessel to store the matrix material. If the vacuum device now generates a vacuum, the matrix material is drawn into the lines by the pressure difference from the supply vessel and finally into the mold volume by the injection device. There it impregnates the fibrous material.

The injection area preferably has matrix lines for connection to the injection device. The matrix material can thus be guided simply to the injection area from a matrix material supply vessel.

The evacuation area also advantageously has vacuum lines for connection to the vacuum device. The evacuation area can therefore be simply connected to a vacuum pump.

A surrounding closure device to define the mold volume to be evacuated is preferably provided on the mold.

The closure device preferably separates the surroundings from the mold volume in the mold into which the fibrous material is introduced. The closure device is advantageously designed so that the mold volume is closed vacuum-tight relative to the surroundings. The closure device is preferably designed flexible in order to be able to compensate for any shifts that occur during the production process for the fiber-reinforced component, for example, by compaction of the fibrous material under vacuum or during infusion of the matrix material or because of thermal expansion. The closure device therefore can advantageously be a flexible adhesive or sealing strip, a liquid or gel-like sealant, a profile seal glued onto the mold or introduced to it or flexible sealing lip applied to the mold or integrated in it.

In a method for production of fiber-reinforced components by means of an injection process with the steps Arrangement of fibrous material in a mold volume, which is limited at least on one side by a mold surface of a mold, Evacuation of the mold volume and injection of matrix material into the mold volume, Injection of the matrix material into the mold volume is carried out through a second partial area of the mold surface and evacuation of the mold volume is carried out through a first partial area of the mold surface.

Accordingly, this avoids the complicated arrangement of two spaces above the fibrous material and the design is significantly simplified.

Evacuation of the mold volume advantageously occurs through a semi-permeable membrane arranged on the mold surface. The semi-permeable membrane is advantageously configured so that it allows gases to pass through but retains the matrix material. Therefore no matrix material can penetrate into the evacuation area, i.e., the first partial area of the mold surface, and clog it. Preferably the mold surface is formed by connecting at least two partial molds designed separate from each other. Because of this it is possible to flexibly construct the mold surface, which images the surface of the fiber-reinforced component during the process, from several partial molds and thus achieve flexibility with respect to component shape and size.

During production of fiber composite components by means of the vacuum-assisted process (VAP) a significant manual expense for process preparation has thus far been required. The invention, which is explained below in a practical example, serves for automation of the infusion structure.

A typical VAP structure is characterized by a fiber blank situated in a one-sided mold, i.e., the fibrous material, aids to distribute the fibrous material in the form of resin, a microporous semi-permeable membrane arranged above it and a vacuum sack enclosing the structure whose film is gas- and matrix-impermeable. Molds (clamping pads) are also locally provided partially on the membrane and vacuum sack. It is easy to comprehend that the preparation of this structure entails significant manual expense, especially in large components with complex inside contour (for example, spherical, with stiffening, etc.). It is sometimes required to integrate distribution of the matrix material in the form of appropriately dimensioned channels and grooves in the mold and/or clamping pads, but error-free mounting and sealing of the two films (membrane and vacuum film) one above the other is still a problem.

In an advantageous embodiment of the invention the suction side with membrane, vacuum distribution and vacuum connections is therefore also integrated in the clamping pads. The inside of the component is almost completely covered with these clamping pads (or alternates with them and those with integrated resin distribution). Sealing of the vacuum structure is then only required between the clamping pads and along the component edge, if not even a sealing cord or sealing lip (for example, made of silicone) is sufficient. The clamping pads on the suction side can be prepared in a separate workplace (also easily automated in the case of simple geometry (for example, constant width)) and positioned on the infusion structure with a corresponding device.

A drastic reduction of manual expense and a reduction in throughput and mold occupation times can be achieved on this account.

BRIEF DESCRIPTION OF THE DRAWING FIGURES

A practical example of the invention is further explained below with reference to the accompanying drawings. In the drawings:

FIG. 2 shows a view from below of the partial molds from FIG. 1; and

FIG. 3 shows a sectional view through line A-A through the partial mold of FIG. 2.

DETAILED DESCRIPTION

Figure 1:
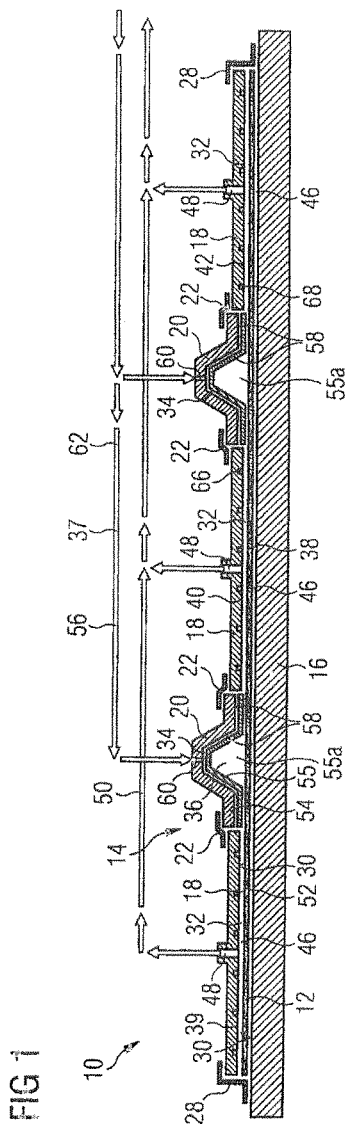
FIG. 1 shows a sectional view of a production device for production of fiber-reinforced components with a mold having several partial molds.

FIG. 1 shows a production device 10 for production of fiber-reinforced components 12 by means of an injection process. The production device 10 has a first mold 14 and a second mold 16. The first mold 14 is formed from several partial molds 18, 20. The partial molds 18, 20 are connected to each other by connection device 22. The first mold 14 is joined by peripheral sealing devices 28 to the second mold 16.

The first mold 14 and the second mold 16 each have a mold surface 30 on the sides facing each other. The mold surface 30 on the first mold 14 is then formed by first partial areas 32 on the first partial molds 18 and by second partial areas 34 on the second partial molds 20.

The two mold surfaces 30 of the first mold 14 and the second mold 18 together with the closure devices form a mold volume 36 to be evacuated, into which a fibrous material can be introduced for impregnation with matrix material 37 and for formation of fiber-reinforced component 12.

A semi-permeable membrane 19 is arranged in the first partial area 32 of mold surface 20 on the first partial mold 18. A puller 40 is also provided on the side of the semi-permeable membrane on the side of the semi-permeable membrane 39 facing the mold surface 30 of the second mold 16, which facilitates loosening of the first partial mold 18 from the finished fiber-reinforced component 12. The semi-permeable membrane 39 and the puller 40 can be formed in the first partial area 32 as a composite 42. The semi-permeable membrane 39, the puller 40 or composite 42 are fastened with a peripheral adhesive 44 of the first partial 32 of the mold surface 30 of the first mold 14.

The first partial mold 18 also has an evacuation area 46 and a vacuum line 48 for connection to a vacuum device 50. Flow aids 52 for better evacuation of the mold volume 36 are arranged on the side of the first partial mold 18 facing the second mold 16.

The second partial mold 20 has only the puller 40 on its side facing the second mold 16. Flow aids 54 for better distribution of the matrix material 37 being injected are also arranged on this side. The second partial mold 20 is arranged around a stiffening element 55, which later remains in the fiber-reinforced component 12. A cavity 55a under the stiffing element remains in the later fiber-reinforced component 12 by introducing a core of foam material or metal.

An injection device 56 with an injection area 58 for injection of matrix material 37 is therefore formed on the second partial mold 20. The second partial mold 20 includes additional matrix line 60, with which the second partial mold 20 can be connected to a matrix distribution device 62.

FIG. 2 shows a lower view of the first partial mold 18. The vacuum line 48 is arranged in the center of the first partial mold 18. Flow aids 52 are arranged on the entire body of the first partial mold 18 in the form of groove 66 or channel 68. As an alternative, the flow aids 52 can also be formed from woven fabric 70, nonwoven 72, knit fabric 74 or a mesh 76.

FIG. 3 shows a sectional view through line A-A of FIG. 2, i.e., through the line on which the vacuum line 48 is arranged. FIG. 3 therefore shows an enlarged depiction of the first partial mold 18 already described in FIG. 1.

In addition to the vacuum line 48 arranged in the center, the first partial mold 18 has a plurality of flow aids 52 in the form of groove 66 on its side facing the second mold 16. A composite 42 from a semi-permeable membrane 39 and a puller 40 is also positioned on this side via a peripheral adhesive 44.

To produce fiber-reinforced components by means of the injection process, the first mold 14 is initially formed by joining several partial molds 18, 20. In the present case three first partial molds 18 and two second partial molds 20 are connected to each other.

Partial areas 32 of the mold surface 30 of the first mold 14 are initially formed. For this purpose a vacuum line 48 is provided on the first mold 18, which can be connected to a vacuum device 50. For better gas feed to the vacuum line 48 flow aids 52 (in the form of groove 66) are provided on one side that faces the second mold 16 in the later structure. On the side of the partial mold 18 provided with groove 66 a composite 42 of semi-permeable membrane 39 and a puller 50 are fastened by means of a peripheral adhesive 44.

The matrix line 60 is provided in the second partial mold 20. A flow aid 54 is provided on the side of the second partial mold 20 facing the second mold 16 in the later structure, which facilities distribution of matrix material 37. A puller 40 is also fastened here.

After production of the partial molds 18, 20 they are joined vacuum-tight to each other by means of connection devices 22. The flexible adhesive or sealing strip can be used as connection device 22, which is applied at the contact points of the partial molds 18, 20. However, a liquid or gel-like sealant can also be used, which is applied, for example, by a nozzle on the contact sites and then cross-linked. It is also possible to use profile seals, which are glued to the edge of the partial molds 18, 20 or introduced to them. Another possibility is the provision of flexible sealing lips, which are mounted on the edges of the partial molds 18, 20 or integrated in them.

Fibrous material 38 is then placed on the second mold 18 to produce the fiber-reinforced component 12. The first mold 14 formed from the two partial molds 18, 20 is arranged above the fibrous material 38. The first mold 14 is now connected vacuum-tight to the second mold 18 via closure device 28. The mold volume 36 to be evacuated is formed on this account between the two molds 14, 16. The matrix lines 16 in the second partial mold 20 are now connected to the matrix distribution device 62, while the vacuum lines 48 in the first partial molds 18 are connected to the vacuum device 50.

By applying a vacuum, for example, by switching on a vacuum pump, a partial vacuum is produced in the mold volume 36, which pulls the matrix material 37 into the mold volume 36 through the matrix distribution device 62 and the matrix line 60. The matrix material 37 is distributed quickly and uniformly over the fibrous material 38 and essentially impregnates it in the thickness direction through the flow aids 54, which are arranged on the side of the second partial molds 20 facing the second mold 16. Gases present in the fibrous material 38 and/or matrix material 37 can now escape through the vacuum device 50.

The semi-permeable membrane 39 provided on the first partial mold 18 prevents matrix material 37 from entering the vacuum line 48 and the flow aids 52. The flow aids 52 cause the air or any other gas present in the mold volume 36 to rapidly enter the vacuum lines 48 in the first partial molds 18 and the mold volume 36 can thus be uniformly and quickly evacuated.

The vacuum of the mold volume 36 is maintained until the areas of the fibrous material 38 situated beneath the first partial molds 18 are completely impregnated. After the fibrous material 38 impregnated with matrix material 37 is completely cured, the molds 14, 16 are released from the fiber-reinforced component 12 so formed. This is facilitated by the puller 40, which prevents sticking of the molds 14, 16 to the finished fiber-reinforced component 12.

A fiber-reinforced component 12 can be simply produced in any shape and size and without demanding structure of several spaces above the fibrous material 38 through the above described production device and the above described method.

During the vacuum-assisted process (VAP) the liquid-impermeable semi-permeable membrane 39 separates the internal area (the mold volume 36) to be filled with the matrix material 37, preferably resin, from the vacuum area 38 without removal of gases (primarily air) from the mold volume 36, i.e., both from the matrix material 37 introduced into the mold volume 36 and from the fibrous material 38. The vacuum connection in the structure described here is integrated in the form of a vacuum line 48 and the semi-permeable membrane 39 in one or more first partial molds 18, which are designed as clamping pads arranged on the component inside.

An important task of this production device consists of the fact that air situated in the fibrous material 38 is drawn off over the surface. In order to guarantee sufficient air supply to the vacuum line 48, it can be advantageous to provide appropriately dimensioned grooves 66 in the body of the first partial mold 18. As an alternative, a textile (for example, woven fabric 70, knit fabric 74, nonwoven 72) or mesh 76 can also be used for this purpose between the semi-permeable membrane 39 and the bottom of the first partial mold 18, in which case unduly strong marking in the component surface should be avoided. A perforated film as puller 40 permits problem-free mold release in the first partial mold 18 and the second partial mold 20 after curing of the fiber-reinforced component 12 and prevents adhesion of the semi-permeable membrane 39 to the fiber-reinforced component 12. The semi-permeable 39 and the puller 40 are glued as blanks along the edge on the bottom of partial mold 18, 20, in which this peripheral adhesive 44, on the one hand, fastens the blank and, on the other hand, prevents liquid matrix material 37 from flowing over the edge into the vacuum area. It is certainly advantageous to use a composite 42 of semi-permeable membrane 39 and puller 40 instead of applying two film blanks individually on the partial molds 18, 20.

Depending on the requirements, the partial molds 18, 20 can be made rigid or flexible and preferably consist of metal or plastic.

In order to further process a dry fibrous material 38 to fiber-reinforced component 12, it should be initially impregnated in an appropriate mold with liquid matrix material 37, preferably resin, and then cured. In the VAP technology corresponding precautions are advantageously taken in order to distribute the matrix material 37 sufficiently quickly in the mold volume. A combination of one or more point or linear gates with a surface distribution medium (for example, an open structure textile) on the surface of the fiber-reinforced component 12 works here. The matrix material 37 is therefore primarily distributed over the surface of the fiber-reinforced component 12 with relatively limited flow resistance and essentially impregnates the fibrous material 38 in the thickness direction. It is also possible to incorporate channel 68 and groove 66 to distribute the matrix material 37 in the molds 14, 16 or in the partial molds 18, 20 so that aids (gate channels and surface flow aids) are saved. The integrated distribution of matrix material 37 is then preferably carried out so that it is impressed as little as possible in the surface of the fiber-reinforced component 12.

In the application example explained below of a stringer-reinforced panel, the distribution of matrix material 37 in the partial molds 20 of the stringer is supposed to be integrated and other gate variants are naturally also conceivable.

A practical example of an infusion structure for production of a panel with two stiffening profiles is shown in FIG. 1, which involves a section across the stiffenings. The side of the fiber-reinforced component 12 facing the second mold 16 is referred to as outside and the side provided with the stiffening profiles is referred to as inside. Two second partial molds 20 with integrated matrix line 60 are situated above the stringer, the remaining surface of the component inside is covered by three first partial molds 18 with integrated vacuum line 48. Only the gap between the partial molds 18, 20 and the outer edge of the first mold 14 so formed are to be sealed relative to the second mold 16 in order to obtain a closed infusion chamber or a closed mold volume 36.

For infusion itself the first partial molds 18 with integrated vacuum line 48 are connected to a vacuum device 50 and the second partial molds 20 with integrated matrix line 60 are connected accordingly to a matrix distribution device 62. The air situated in the fibrous material 38 is drawn off by the vacuum. The partial vacuum prevailing in the infusion chamber therefore acts as driving force for flow of the matrix material 37. The matrix material 37 flows along the stringer into the mold volume 36 and is distributed downward and sideward until the areas beneath the first partial molds 18 are completely impregnated. The semi-permeable membranes 39 apply to these partial molds 18 then prevent matrix material 37 from entering the vacuum lines 48.

Different variants are possible for vacuum-tight closure of the mold volume 36. It must then be kept in mind that sealing in some cases should have a certain flexibility in order to be able to compensate for any displacements that occur, for example, by compaction of the fibrous material 38 under vacuum or during infusion or because of thermal expansion. Some examples will be mentioned here:

1. A flexible adhesive/sealing strip, which is applied to the contact sites of the partial molds 18, 20 and along the edges of the partial molds 18, 20 relative to the second mold 16.
2. Liquid or gel-like sealant, which is applied by a nozzle to the sealing joints and then cross-linked.
3. Profile seals glued to the partial molds 18, 20 or inserted in them (for example, groove with a silicone sealing cord).
4. Flexible sealing lips (for example, made of silicone) applied to the partial molds 18, 20 are integrated in them.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE NUMBERS

10 Production device
12 Fiber-reinforced component
14 First mold
16 Second mold
18 First partial mold
20 Second partial mold
22 Connection device
24 First outer partial mold
26 Second outer partial mold
28 Closure device
30 Mold surface
32 First partial area
34 Second partial area
36 Mold volume
37 Matrix material
38 Fibrous material
39 Semi-permeable membrane
40 Puller
42 Composite
44 Peripheral adhesive
46 Evacuation area
48 Vacuum line
50 Vacuum device
52 Flow aid
54 Flow aid
55 Stiffening element
55a Cavity
56 Injection device
58 Injection area
60 Matrix line
62 Matrix distribution device
66 Grooves
68 Channels
70 Woven fabric
72 Nonwoven
74 Knit fabric
76 Mesh

The invention claimed is:

1. A mold for a production device for production of a fiber-reinforced component by means of an injection process, the mold comprising:
    a mold surface configured to form a surface of the fiber-reinforced component, wherein the mold surface is formed from a plurality of rigid partial molds, and wherein the mold surface has a first partial area formed in a first rigid partial mold and a second partial area formed in a second rigid partial mold;
    an injection area configured for injection of matrix material into fibrous material situated on the mold surface through the second partial area of the mold surface; and
    an evacuation area configured for evacuation of a mold volume bounded by the mold through the first partial area of the mold surface, wherein the evacuation area comprises a vacuum line extending through the first rigid partial mold in a direction normal to the mold surface,
    wherein a semi-permeable membrane and a puller are formed as the first partial area and as a composite, wherein the semi-permeable membrane is configured for passage of gases and for retention of matrix material, and wherein the puller is configured for removal of the fiber-reinforced component from the mold.

2. The mold according to claim 1, wherein the composite is fastened to the mold surface with a peripheral adhesive.

3. The mold according to claim 1, wherein
    the second partial area of the mold surface includes flow aids configured to support distribution of the injected matrix material, or
    the first partial area includes flow aids configured to support evacuation of the mold volume.

4. The mold according to claim 3, wherein the flow aids in the first or second partial area have grooves, channels, woven fabric, nonwoven, knit fabric, or a mesh.

5. The mold according to claim 3, wherein the flow aids in the first rigid partial area are configured to direct gases in the mold volume to enter the vacuum line in the first rigid partial mold.

6. The mold according to claim 1, wherein the first and second rigid partial molds are separate from each other but connectable to each other.

7. The mold according to claim 6, further comprising:
a connection device configured to tightly connect the rigid partial molds.

8. The mold according to claim 1, wherein the vacuum line extends through a center of the first rigid partial mold from the mold surface to an outside of the mold.

9. A production device for production of a fiber-reinforced component by means of an injection process, the production device comprising:
a mold, which includes
a mold surface configured to form a surface of the fiber-reinforced component, wherein the mold surface is formed from a plurality of rigid partial molds, and wherein the mold surface has a first partial area from in a first rigid partial mold and a second partial area formed in a second rigid partial mold;
an injection area configured for injection of matrix material into fibrous material situated on the mold surface through the second partial area of the mold surface; and
an evacuation area configured for evacuation of a mold volume bounded by the mold through the first partial area of the mold surface, wherein the evacuation area comprises a vacuum line extending through the first rigid partial mold in a direction normal to the mold surface;
a vacuum device configured to evacuate the mold volume via the vacuum line; and
an injection device configured to inject the matrix material into the mold volume via the injection area, in order to force a fibrous material into the area of the mold surface within the mold volume,
wherein a semi-permeable membrane and a puller are formed as the first partial area and as a composite, wherein the semi-permeable membrane is configured for passage of gases and for retention of matrix material, and wherein the puller is configured for removal of the fiber-reinforced component from the mold.

10. The production device according to claim 9, wherein the injection device has a matrix distribution device configured to distribute the matrix material.

11. The production device according to claim 9, further comprising:
a peripheral sealing device configured to seal the mold volume to be evacuated on the mold.

12. The production device according to claim 9, wherein the injection area has a matrix line configured to connect to the injection device.

13. The production device according to claim 9, wherein the vacuum line extends through a center of the first rigid partial mold from the mold surface to an outside of the mold.

14. The production device according to claim 9, wherein the first partial area includes flow aids configured to direct gases in the mold volume to enter the vacuum line in the first rigid partial mold.

* * * * *